US008291771B2

(12) United States Patent
Nakamura

(10) Patent No.: US 8,291,771 B2

(45) Date of Patent: Oct. 23, 2012

(54) ELECTRONIC APPARATUS WITH SENSOR

(75) Inventor: Hisao Nakamura, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 12/932,447

(22) Filed: Feb. 24, 2011

(65) Prior Publication Data

US 2011/0219882 A1 Sep. 15, 2011

(30) Foreign Application Priority Data

Mar. 15, 2010 (JP) ................................ 2010-058435

(51) Int. Cl.
*G01L 7/00* (2006.01)

(52) U.S. Cl. ........................................................ 73/756

(58) Field of Classification Search ............. 73/700–756
See application file for complete search history.

(56) References Cited

U.S. PATENT DOCUMENTS

| | | | | |
|---|---|---|---|---|
| 3,696,610 | A * | 10/1972 | Charbonnier | 368/1 |
| 4,783,772 | A * | 11/1988 | Umemoto et al. | 368/11 |
| 5,357,488 | A * | 10/1994 | Udo et al. | 368/11 |
| 5,481,506 | A * | 1/1996 | Kita | 368/10 |
| 5,592,442 | A * | 1/1997 | Nishikawa et al. | 368/11 |
| 7,159,469 | B2 * | 1/2007 | Claude et al. | 73/756 |
| 7,600,430 | B2 * | 10/2009 | Palin et al. | 73/700 |
| 7,698,950 | B2 * | 4/2010 | Kraatz | 73/708 |
| 7,778,115 | B2 * | 8/2010 | Ruchonnet | 368/11 |
| 2004/0173026 | A1 * | 9/2004 | Tanifuji | 73/753 |
| 2009/0249882 | A1 * | 10/2009 | Kraatz | 73/708 |
| 2012/0056750 | A1 * | 3/2012 | Kim et al. | 340/665 |

FOREIGN PATENT DOCUMENTS

JP 62184447 11/1987

OTHER PUBLICATIONS

Abstract, publication No. JP4282489, publication date Oct. 7, 1992.
Abstract, publication No. JP270551, publication date Oct. 20, 1995.

* cited by examiner

*Primary Examiner* — Andre Allen
(74) *Attorney, Agent, or Firm* — Adams & Wilks

(57) ABSTRACT

An electronic apparatus with a sensor has an exterior case, a sensor unit arranged inside the exterior case for detecting pressure, and a sensor holding frame arranged between the exterior case and the sensor unit for mounting the sensor unit on the exterior case. The sensor holding frame includes a sensor accommodating portion which accommodates the sensor unit and which has a pressure chamber into which the pressure is taken in front of a sensor body of the sensor unit, and a pressure introducing passage through which pressure is introduced into the pressure chamber from outside the exterior case. A center axis of the sensor accommodating portion and a center axis of the pressure introducing passage are displaced from each other.

20 Claims, 6 Drawing Sheets

ELECTRONIC APPARATUS WITH SENSOR

BACKGROUND OF THE INVENTION

1. Field of the Invention

The present invention relates to an electronic apparatus with a sensor which can measure atmospheric pressure or water pressure, for example.

2. Background Art

Conventionally, there has been known a wristwatch with a sensor which is provided with a sensor unit such as a pressure sensor. This type of wristwatch with a sensor is constituted such that an opening portion is formed in an apparatus case (exterior case), and a sensor unit is housed in the opening portion from the outside of the apparatus case. In such a wristwatch, the sensor unit is configured to be pushed into the inside of an opening portion by a pushing panel by way of a packing so that the wristwatch can ensure the sealing property of the inside of the apparatus case (see JP-A-4-282489 (patent document 1), for example).

Also there has been known an electronic apparatus with a sensor in which a sensor receiving surface is formed on a panel frame which constitutes a part of a timepiece movement, and a sensor (pressure sensor) is arranged on the sensor receiving surface. Due to such a constitution, the sensor can be fixed to the inside of an exterior case (see JP-A-7-270551 (patent document 2), for example).

In patent document 1 and patent document 2, a detection part of the sensor is arranged to face an outer surface of the case so that the sensor can detect pressure outside the exterior case.

On the other hand, there has been known a timepiece in which a can which can accommodate a sensor therein is formed in the inside of the timepiece case (exterior case) (see JP-UM-A-62-184447 (patent document 3), for example).

A pressure introducing hole through which pressure is introduced is formed in a portion of the can where the sensor is accommodated, and the can is formed by applying drawing to a metal sheet using a press or the like in general. By forming the pressure introducing hole in the can, it is possible to arrange the sensor on a back surface side of the timepiece case.

However, in patent document 1 or patent document 2, to allow the sensor to perform a function thereof satisfactorily, it is necessary to arrange a detection part on an outer surface of the exterior case. That is, it is necessary to ensure a space for arranging the case on an outer surface of the exterior case thus giving rise to a drawback that the exterior case becomes large-sized by an amount corresponding to the space.

On the other hand, to prevent the large-sizing of the exterior case, it is necessary to miniaturize a timepiece display part. This miniaturization of the timepiece, however, gives rise to a drawback that the acquisition of favorable visibility of the timepiece display part becomes difficult.

To the contrary, in patent document 3, the sensor is arranged on a back surface side of the exterior case, and it is sufficient to only form the pressure introducing hole in an outer surface of the exterior case and hence, it may be possible to miniaturize the case compared to the case disclosed in patent document 1 and the case disclosed in patent document 2. In these cases, however, it is necessary to form the can by drawing or the like and hence, it is difficult to offset or incline a center axis of the pressure introducing hole with respect to a center axis of the portion where the sensor is accommodated.

As a result, it is necessary to arrange the timepiece display part or the timepiece movement and the sensor parallel to each other in the surface direction of the display part thus giving rise to a drawback that it is difficult to effectively realize the miniaturization of the timepiece case so that the restriction is imposed on the layout of the sensor.

Further, the increase of a wall thickness of the can is difficult in view of the forming of the can by drawing so that it is difficult to increase the rigidity of the can. As a result, it is difficult to ensure the sealing property between the case and the can. On the other hand, when the can is made large-sized for increasing the rigidity, there arises a drawback that the timepiece case becomes large-sized eventually.

SUMMARY OF THE INVENTION

It is an aspect of the present application to provide an electronic apparatus with a sensor which can effectively realize the miniaturization of an exterior case, and also enhance the layout property of the pressure sensor.

Further, it is another aspect of the present application to provide an electronic apparatus with a sensor which can reliably ensure the sealing property of an exterior case.

According to another aspect of the present application, there is provided an electronic apparatus with a sensor which includes: an exterior case; a sensor unit which is arranged in the inside of the exterior case and detects pressure; and a sensor holding frame which is arranged between the exterior case and the sensor unit, and is provided for mounting the sensor unit on the exterior case, wherein the sensor holding frame includes: a sensor accommodating portion which accommodates the sensor unit and is provided with a pressure chamber into which the pressure is taken in front of a detection part of the sensor unit; and a pressure introducing passage through which pressure is introduced into the pressure chamber from the outside of the exterior case, and a center axis of the sensor accommodating portion and a center axis of the pressure introducing passage are displaced from each other.

Due to such a constitution, it is possible to arrange the pressure introducing passage corresponding to a space formed in the inside of the exterior case while arranging the sensor unit on a back surface side of the exterior case. Accordingly, the layout property of the sensor unit can be enhanced, and the miniaturization of the exterior case can be effectively realized.

In the electronic apparatus with a sensor according to the present application, the center axis of the pressure introducing passage may be offset from the center axis of the sensor accommodating portion.

Due to such a constitution, a projecting amount of the sensor accommodating portion toward one side in the radial direction with respect to the pressure introducing passage can be suppressed. Accordingly, even when the pressure introducing passage is arranged at an area in the vicinity of an outer peripheral portion of the exterior case, it is possible to suppress the increase of an area of an outer surface of the exterior case.

In the electronic apparatus with a sensor according to the present application, the center axis of the pressure introducing passage may intersect with the center axis of the sensor accommodating portion.

Due to such a constitution, the degree of freedom in the layout of the sensor unit can be enhanced so that the variation in design of the electronic apparatus with a sensor can be increased.

In the electronic apparatus with a sensor according to the present application, the sensor holding frame may be formed using a resin, and a reinforcing tube for enhancing the rigidity of the pressure introducing passage may be mounted on an inner peripheral surface of the pressure introducing passage.

Due to such a constitution, the productivity of the sensor holding frame can be enhanced so that the sensor holding frame can be formed at a low cost. Further, the sealing property between the exterior case and the sensor holding frame can be reliably ensured by an amount that the rigidity of the pressure introducing passage is increased while realizing the miniaturization of the sensor holding frame.

In the electronic apparatus with a sensor according to the present application, a cover in which a plurality of small-diameter holes are formed in a penetrating manner is provided at a position corresponding to an opening end of the pressure introducing passage in the exterior case.

Due to such a constitution, the intrusion of dusts into the inside of the pressure introducing passage can be suppressed and hence, an erroneous operation of the sensor unit can be prevented. Accordingly, it is possible to provide the highly reliable electronic apparatus with a sensor.

In the electronic apparatus with a sensor according to the present application, a timepiece movement may be arranged in the inside of the exterior case, and the sensor holding frame may be arranged on a back surface of the timepiece movement such that at least a portion of the sensor accommodating portion overlaps with the sensor holding frame.

Due to such a constitution, an area of a surface of the exterior case can be decreased by an amount corresponding to overlapping of the timepiece movement and the sensor accommodating portion. Accordingly, it is possible to miniaturize the electronic apparatus with a sensor in a more reliable manner.

According to the present application, it is possible to arrange the pressure introducing passage corresponding to a space formed in the inside of the exterior case while arranging the sensor unit on a back surface side of the exterior case. Accordingly, the layout property of the sensor unit can be enhanced, and the miniaturization of the exterior case can be effectively realized.

Further, the sealing property between the exterior case and the sensor holding frame can be reliably ensured by an amount that the rigidity of the pressure introducing passage is increased while realizing the miniaturization of the sensor holding frame.

DESCRIPTION OF THE PREFERRED EMBODIMENT

First Embodiment (Electronic Timepiece with Pressure Sensor)

Figure 1:
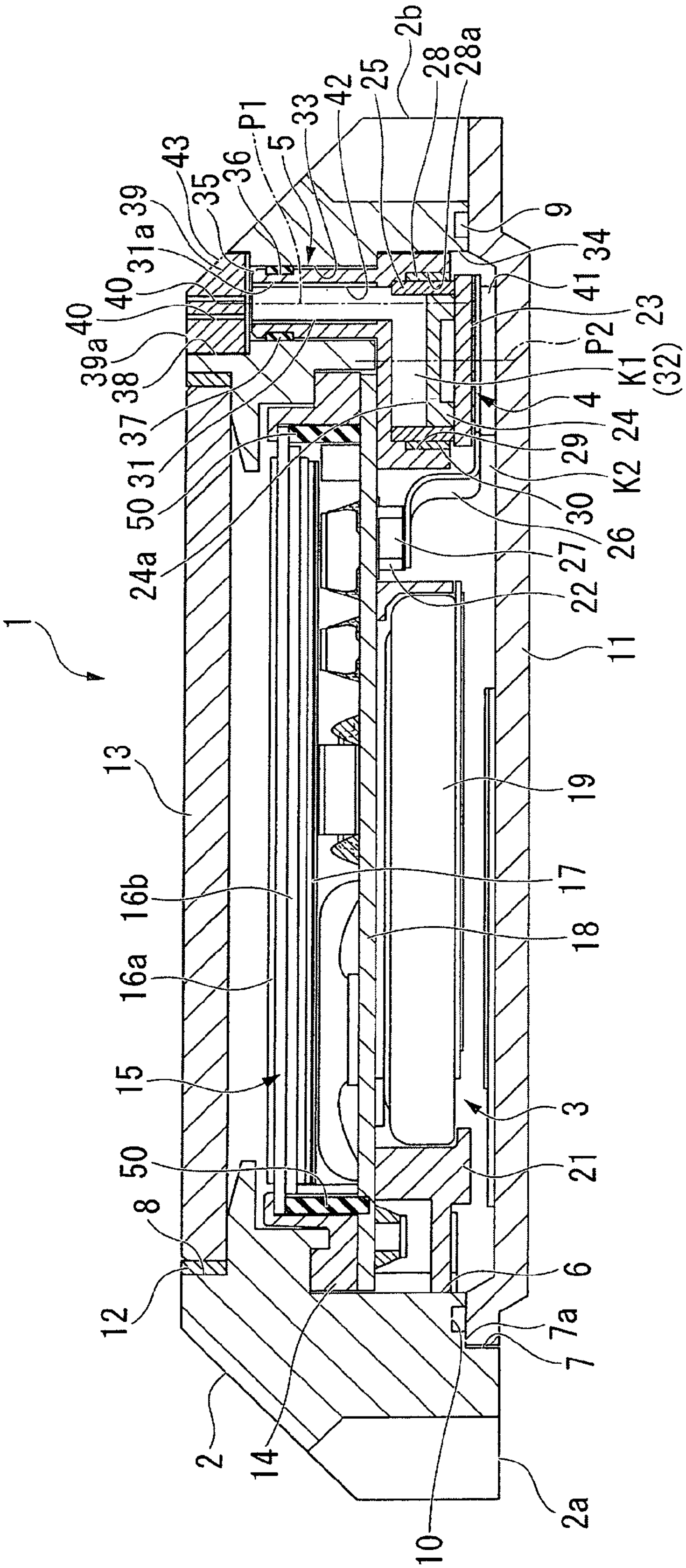
FIG. 1 is a longitudinal cross-sectional view of an electronic timepiece with a pressure sensor according to a first embodiment of the present invention.
Figure 2:
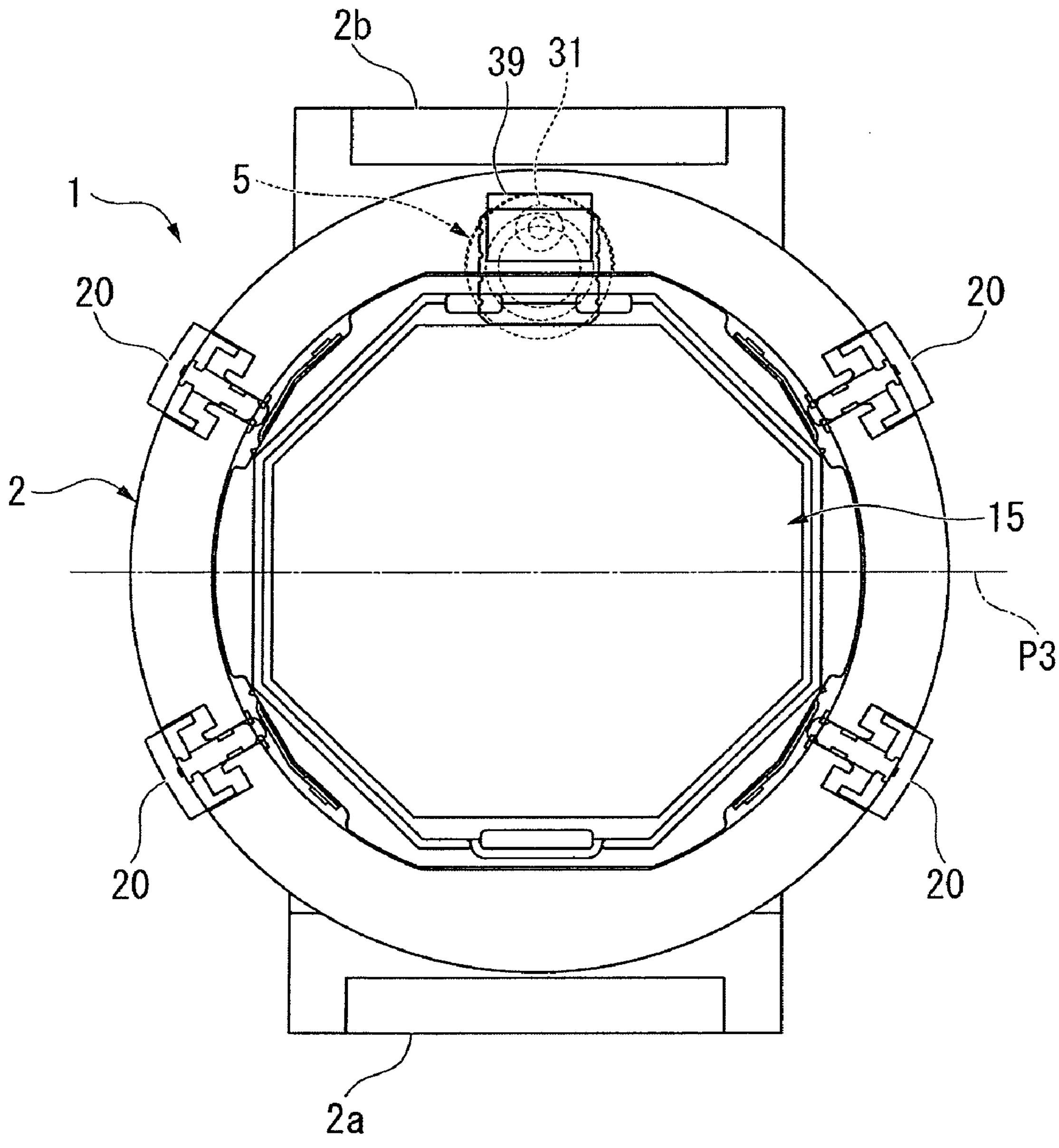
FIG. 2 is a front view of the electronic timepiece with a pressure sensor according to the first embodiment of the present invention.
Figure 3:
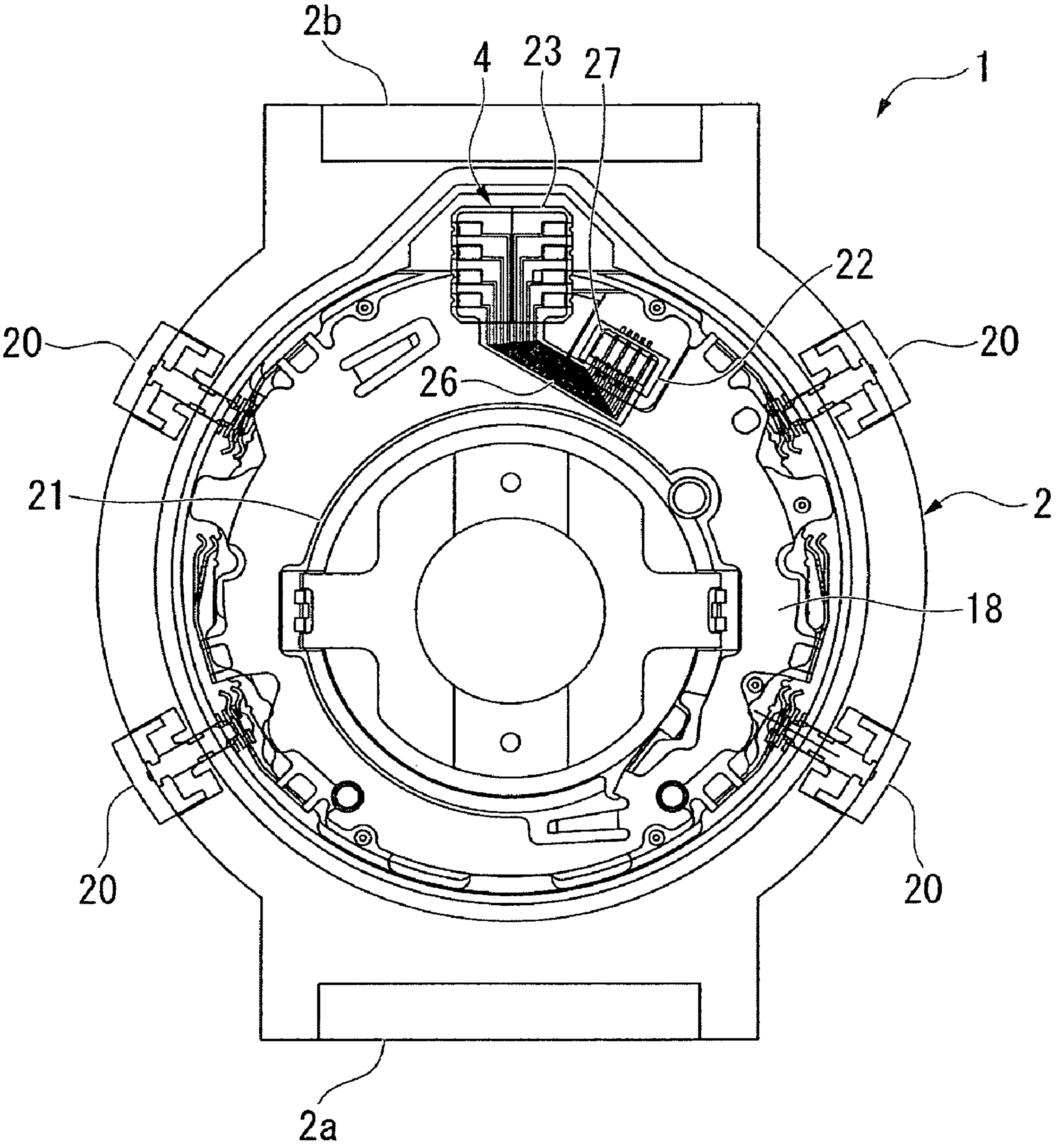
FIG. 3 is a plan view of the electronic timepiece with a pressure sensor according to the first embodiment of the present invention as viewed from a back surface side of the electronic timepiece.

Next, the first embodiment of the present invention is explained in conjunction with FIG. 1 to FIG. 3.

FIG. 1 is a longitudinal cross-sectional view of an electronic timepiece 1 with a pressure sensor, and FIG. 2 is a front view of the electronic timepiece 1 with a pressure sensor. Here, in the explanation made hereinafter, there may be a case where, in a state where a user wears the electronic timepiece 1 with a pressure sensor, a surface of the electronic timepiece 1 with a pressure sensor which is brought into contact with an arm of the user is expressed as a back surface side, and a surface of the electronic timepiece 1 with a pressure sensor which is positioned on a side opposite to the back surface side and is directed outward is expressed as an outer surface side.

As shown in FIG. 1 and FIG. 2, the electronic timepiece 1 with a pressure sensor includes an exterior case 2, a timepiece movement 3 which is arranged in the inside of the exterior case 2, and a sensor unit 4. The sensor unit 4 is supported in the inside of the exterior case 2 by way of a sensor holding frame 5.

On a side surface of the exterior case 2, band mounting portions 2*a*, 2*b* for mounting a timepiece band (not shown in the drawing) are formed on a 6 o'clock side and on a 12 o'clock side respectively. Further, on the side surface of the exterior case 2, a plurality of (in this embodiment, 4) changeover switches 20 are mounted. The changeover switches 20 are provided for changing over a content displayed on a liquid crystal panel 15 described later.

On most of the center of the exterior case 2, an opening portion 6 having an approximately circular shape as viewed in a plan view is formed. A recessed portion 7 whose diameter is set larger than a diameter of the opening portion 6 by a stepped portion is formed on a back surface side (a lower side in FIG. 1, a depth side in the direction perpendicular to a paper surface in FIG. 2) of the exterior case 2, and a recessed portion 8 whose diameter is set larger than the diameter of the opening portion 6 by a stepped portion is formed on an outer surface side (an upper side in FIG. 1, a viewer's side in the direction perpendicular to the paper surface in FIG. 2) of the exterior case 2. A packing groove 10 for mounting a ring-shaped packing 9 on a stepped surface 7*a* is formed on the back-surface-side recessed portion 7. Aback lid 11 is mounted on the recessed portion 7 so as to close the opening portion 6 after the packing 9 is fitted into the packing groove 10.

On the other hand, on the recessed portion 8 which is formed on the outer surface side of the exterior case 2, a face glass 13 is mounted so as to close the opening portion 6 by way of a packing 12 which is mounted on an inner peripheral surface of the recessed portion 8. The timepiece movement 3 is arranged in the inner space of the opening portion 6 which is closed by the back lid 11 and the face glass 13.

The timepiece movement 3 includes a panel frame 14 which is formed into an approximately ring shape, and the panel frame 14 is mounted on the opening portion 6 of the exterior case 2. The liquid crystal panel 15 is held on an outer surface side of the panel frame 14. That is, the liquid crystal panel 15 is mounted on the exterior case 2 by way of the panel frame 14.

The liquid crystal panel 15 is configured such that liquid crystal is sealed in a gap defined between a pair of glass substrates 16*a*, 16*b*, and the liquid crystal panel 15 performs a time display, a display of a detection result obtained by the sensor unit 4 and the like. Further, on aback surface side of the liquid crystal panel 15, an EL (Electroluminescence) panel 17 which illuminates the liquid crystal panel 15 from a back surface side is mounted.

FIG. 3 is a plan view of the electronic timepiece 1 with a pressure sensor as viewed from a back surface side and shows a state where the back lid 11 is removed from the electronic timepiece 1.

As shown in FIG. 1 and FIG. 3, on a more back surface side of the panel frame 14 than the EL panel 17, a printed circuit board 18 is provided. The printed circuit board 18 is formed into an approximately circular shape as viewed in a plan view so as to correspond to a shape of the opening portion 6, and a predetermined wiring pattern is formed on a surface of the printed circuit board 18. Electronic parts are mounted on the wiring pattern at predetermined positions respectively. As the electronic parts, an IC chip which controls contents to be displayed on the liquid crystal panel 15 and oscillations for times, a capacitor and the like can be named.

Further, on an outer surface side of the printed circuit board 18, at a position corresponding to the outer peripheral portion of the liquid crystal panel 15, a conductive rubber 50 is mounted in a state where the conductive rubber 50 extends between the printed circuit board 18 and the liquid crystal panel 15. The printed circuit board 18 and the liquid crystal panel 15 are electrically connected with each other via the conductive rubber 50.

On a back surface side of the printed circuit board 18, a button-type battery 19 which constitutes a drive power source for supplying electric power to respective electronic parts is mounted. The battery 19 is held by a battery frame 21 which is fixed to the printed circuit board 18.

A changeover switch 20 which is mounted on the exterior case 2 is electrically connected to an outer periphery of the printed circuit board 18. Due to such a constitution, the display on the liquid crystal panel 15 is changed over based on the manipulation of the changeover switch 20.

A connector socket 22 is mounted on the printed circuit board 18 on a 1 o'clock side. The connector socket 22 is provided for electrically connecting the sensor unit 4 and the printed circuit board 18.

As shown in FIG. 1 to FIG. 3, the sensor unit 4 is arranged in the inside of the exterior case 2 on a 12 o'clock side and on a back surface side in a state where the sensor unit 4 is integrally formed with the sensor holding frame 5. On the 12 o'clock side of the exterior case 2, a recessed portion 34 which allows an arrangement of the sensor unit 4 therein is formed on the back surface side of the exterior case 2, and the recessed portion 34 is communicated with the opening portion 6.

The sensor unit 4 includes a substrate 23 on which a predetermined wiring pattern is formed, a sensor body (detection part) 24 which is mounted on an outer surface side of the substrate 23, and a metal-made sensor protecting member 25 which is formed into a cylindrical shape so as to surround the periphery of the sensor body 24.

The sensor body 24 is a semiconductor pressure sensor such as a bridge resistance which measures atmospheric pressure, for example. Here, the sensor body 24 may be a pressure sensor which measures water pressure instead of atmospheric pressure.

The sensor protecting member 25 is arranged such that one end of the sensor protecting member 25 is brought into contact with the substrate 23. A length of the sensor protecting member 25 in the axial direction is set greater than a thickness of the sensor body 24. That is, in a state where the sensor protecting member 25 is arranged on the substrate 23, the other end of the sensor protecting member 25 projects from a front surface (detection surface) 24*a* of the sensor body 24.

The substrate 23 is formed into an approximately quadrangular shape as viewed in a plan view, and one end of a flexible printed circuit board 26 is connected to the wiring pattern at a predetermined position.

The flexible printed circuit board 26 is provided for electrically connecting the substrate 23 and the printed circuit board 18, and a connector socket 27 which can be fitted into a connector socket 22 of the printed circuit board 18 is formed on the other end of the flexible printed circuit board 26. These connector sockets 22, 27 are formed such that the connector socket 22 on a printed circuit board 18 side constitutes a female socket and the connector socket 27 on a flexible printed circuit board 26 side constitutes a male socket, for example.

By electrically connecting the printed circuit board 18 and the substrate 23 to each other via the flexible printed circuit board 26 in this manner, a detection signal of the sensor body 24 is outputted to the printed circuit board 18, and a detection result of the sensor body 24 is displayed on the liquid crystal panel 15 with a predetermined display content.

Here, with respect to the display content, a detection result (atmospheric pressure, water pressure or the like) detected by the sensor body 24 is directly displayed or, for example, an altitude of standing position of a user is calculated based on atmospheric pressure using an IC chip or the like mounted on the printed circuit board 18, and the altitude is displayed on the liquid crystal panel 15.

(Sensor Holding Frame)

The sensor holding frame 5 which holds the sensor unit 4 is formed using a resin, and includes a bottomed cylindrical sensor accommodating portion 28 in which the sensor protecting member 25 of the sensor unit 4 can be accommodated in a state where the sensor protecting member 25 is fitted into the sensor accommodating portion 28. The sensor accommodating portion 28 is arranged such that an opening portion 28*a* is directed toward a back surface side, and the sensor unit 4 is inserted into the sensor accommodating portion 28 from a back surface side.

In a state where the sensor unit 4 is inserted into the sensor accommodating portion 28, the other end of the sensor protecting member 25 of the sensor unit 4 is brought into contact with a bottom portion 28*b* of the sensor accommodating portion 28.

The other end of the sensor protecting member 25 projects from the front surface 24*a* of the sensor body 24 and hence, in a state where the sensor unit 4 is accommodated in the sensor accommodating portion 28, a space K1 is formed between the bottom portion 28*b* of the sensor accommodating portion 28 and the front surface 24*a* of the sensor body 24.

Further, on an inner peripheral surface of the sensor accommodating portion 28, an enlarged diameter portion 29 is formed by a stepped portion between an area in the vicinity of the bottom portion 28*b* and the opening portion 28*a*. A ring-shaped packing 30 is fitted into the enlarged diameter portion

29 thus ensuring the sealing property between the sensor accommodating portion 28 and the sensor protecting member 25.

Further, a cylindrical pressure introducing passage 31 is formed on the bottom portion 28*b* of the sensor accommodating portion 28 in an erected manner toward an outer surface side. The pressure introducing passage 31 extends from the bottom portion 28*b* of the sensor accommodating portion 28 to an area in the vicinity of the outer surface of the exterior case 2.

The pressure introducing passage 31 is provided for introducing external pressure (atmospheric pressure or water pressure, for example) outside the exterior case 2 to the sensor accommodating portion 28, and is communicated with the space K1 formed in the sensor accommodating portion 28. That is, the space K1 functions as a pressure chamber 32 for allowing the sensor body 24 to accurately detect pressure (atmospheric pressure or water pressure or the like).

Further, the pressure introducing passage 31 is arranged in a state where a center axis P1 of the pressure introducing passage 31 is offset from a center axis P2 of the sensor accommodating portion 28. To be more specific, the pressure introducing passage 31 is formed in an erected manner on the bottom portion 28*b* of the sensor accommodating portion 28 on a 12 o'clock side.

A sensor hole 33 which allows the insertion of the pressure introducing passage 31 is formed in the exterior case 2 on a more 12 o'clock side than the opening portion 6 in the thickness direction of the exterior case 2. The sensor hole 33 is communicated with the recessed portion 34 formed in the exterior case 2.

The recessed portion 34 is formed in size which allows the recessed portion 34 to accommodate the sensor accommodating portion 28 therein. That is, the sensor holding frame 5 is mounted such that the pressure introducing passage 31 is inserted into the sensor hole 33 from the back surface side of the exterior case 2.

The center axis P1 of the pressure introducing passage 31 is offset toward a 12 o'clock side with respect to the center axis P2 of the sensor accommodating portion 28 and hence, the sensor accommodating portion 28 is displaced on a more 6 o'clock side than the pressure introducing passage 31. In such a state, a portion of the sensor accommodating portion 28, that is, a portion of the sensor accommodating portion 28 on a more 6 o'clock side than the approximately center of the sensor accommodating portion 28 in the radial direction is, in a state where the sensor holding frame 5 is mounted on the exterior case 2, positioned on a back surface side of the printed circuit board 18. That is, a portion of the printed circuit board 18 and a portion of the sensor accommodating portion 28 overlap with each other in the thickness direction of the exterior case 2.

Further, in a state where the sensor holding frame 5 is mounted on the exterior case 2, a gap K2 is formed between the sensor unit 4 and the back lid 11. The back lid 11 is provided with a planar cushion material 41 at a position corresponding to the sensor unit 4.

The cushion material 41, in a state where the respective parts are mounted on the exterior case 2, plays a role of absorbing the size tolerance of the gap K2 formed between the sensor unit 4 and the back lid 11 and a role of attenuating an external impact transmitted to the sensor unit 4 by way of the back lid 11.

By enhancing forming accuracy and assembling accuracy of the respective parts, the gap K2 may not be formed between the sensor unit 4 and the back lid 11. In this case, the cushion material 41 may not be provided at a position where the back lid 11 corresponds to the sensor unit 4.

A chamfered portion 35 is formed on a distal end (an upper end in FIG. 1), that is, an opening end of the pressure introducing passage 31 thus enabling the smooth insertion of the pressure introducing passage 31 into the sensor hole 33. A packing groove 36 is formed on a distal end side of an outer peripheral surface of the pressure introducing passage 31. A ring-shaped packing 37 is mounted in the packing groove 36 thus ensuring the sealing property between the sensor hole 33 formed in the exterior case 2 and the pressure introducing passage 31.

On an inner peripheral surface of the pressure introducing passage 31, an enlarged-diameter portion 31*a* which has a diameter thereof enlarged by a stepped portion is formed over the whole length in the longitudinal direction. A metal sleeve 42 is fitted into and fixed to the enlarged-diameter portion 31*a*. The metal sleeve 42 plays a role of enhancing the rigidity of the pressure introducing passage 31. Accordingly, a packing 37 is mounted on an outer peripheral surface of the pressure introducing passage 31 so that it is possible to surely prevent the pressure introducing passage 31 from being damaged even when the pressure introducing passage 31 receives a pressure from the packing 37.

An open recessed portion 38 which makes the sensor hole 33 and the outside of the exterior case 2 communicate with each other is formed on a portion of the exterior case 2 corresponding to the sensor hole 33. That is, the open recessed portion 38 is formed on a more 12 o'clock side than the face glass 13 mounted on the exterior case 2. The open recessed portion 38 is formed in an approximately quadrangular shape as viewed in a plan view and is elongated along a straight line P3 which connects a 9 o'clock position and a 3 o'clock position (see FIG. 2)

The open recessed portion 38 is provided with a cover 39 which closes the open recessed portion 38. That is, the cover 39 is provided on a distal end (opening end) side of the pressure introducing passage 31.

The cover 39 is provided for preventing the intrusion of dusts into the inside of the pressure introducing passage 31, and a plurality of small-diameter holes 40 are formed in the cover 39 in a penetrating manner in the thickness direction of the cover 39. Due to such a constitution, it is possible to prevent the intrusion of dusts into the inside of the pressure introducing passage 31 while allowing the introduction of atmospheric air, water or the like into the inside of the pressure introducing passage 31 by way of the small-diameter holes 40.

The cover 39 is formed corresponding to an outer surface of the exterior case 2 such that an outer surface 39*a* side of the cover 39 becomes coplanar with an outer surface of the exterior case 2. To be more specific, in the first embodiment, a chamfered portion 43 is formed on the outer surface 39*a* of the cover 39. By forming the cover 39 in this manner, the aesthetic appearance of the exterior case 2 is enhanced.

By adopting the above-mentioned constitution, atmospheric air or water is introduced into the pressure chamber 32 by way of the pressure introducing passage 31 and atmospheric pressure or water pressure is detected by the sensor body 24. A detection result is outputted to the printed circuit board 18 as a signal through the flexible printed circuit board 26. Then, the signal is inputted to an IC chip or the like mounted on the printed circuit board 18, and a calculation content is displayed on the liquid crystal panel 15 based on a calculation result of the IC chip or the like.

In this manner, according to the above-mentioned first embodiment, instead of directly fixing the sensor unit 4 to the exterior case 2, the sensor unit 4 is fixed to the exterior case 2 by way of the sensor holding frame 5 and hence, the layout property of the sensor unit 4 is enhanced.

Further, the sensor holding frame 5 is constituted of the sensor accommodating portion 28 which has the pressure chamber 32 and the pressure introducing passage 31 which can introduce atmospheric air or water into the pressure chamber 32, and the center axis P1 of the pressure introducing passage 31 is offset from the center axis P2 of the sensor accommodating portion 28. Due to such a constitution, the sensor accommodating portion 28 can be arranged on the back surface side of the printed circuit board 18 by displacing the sensor accommodating portion 28 on a more 6 o'clock side than the pressure introducing passage 31.

That is, it is unnecessary to expose the sensor unit 4 per se on the outer surface of the exterior case 2 and hence, it is possible to expose only the pressure introducing passage 31 on the outer surface of the exterior case 2, and to arrange the sensor unit 4 more inside in the radial direction than the pressure introducing passage 31. Accordingly, an area of the outer surface of the exterior case 2 can be decreased and hence, the exterior case 2 can be miniaturized.

Here, in forming the sensor holding frame 5 by molding using a resin, it is often the case where the forming by molding is performed using a mold (not shown in the drawing). Since the center axis P1 of the pressure introducing passage 31 is only offset from the center axis P2 of the sensor accommodating portion 28, compared to a case where the center axis P1 is inclined with respect to the center axis P2, it is possible to easily form the sensor holding frame 5 by molding. That is, a cost of the mold used for forming the sensor holding frame by molding can be decreased. In this manner, the exterior case 2 can be miniaturized while decreasing the manufacturing cost of the sensor holding frame 5.

Further, the metal sleeve 42 is fitted into and fixed to the pressure introducing passage 31 of the sensor holding frame 5 formed by molding using a resin and hence, the rigidity of the pressure introducing passage 31 can be enhanced. Accordingly, while setting a wall thickness of the pressure introducing passage 31 thin, it is possible to surely prevent the pressure introducing passage 31 from being damaged by pressure from the packing 37. Further, by an amount corresponding to the increase of the rigidity of the pressure introducing passage 31, the sealing property between the pressure introducing passage 31 and the sensor hole 33 formed in the exterior case 2 can be surely maintained.

Further, the cover 39 in which the plurality of small-diameter holes 40 are formed is mounted in the open recessed portion 38 formed in the exterior case 2 at a position corresponding to the pressure introducing passage 31 and hence, the intrusion of dusts into the inside of the pressure introducing passage 31 can be prevented. Accordingly, an erroneous operation of the sensor body 24 attributed to the intrusion of dusts can be prevented thus providing the highly reliable electronic timepiece 1 with a pressure sensor.

In the above-mentioned first embodiment, the explanation has been made with respect to the case where the metal sleeve 42 is fitted into and fixed to the pressure introducing passage 31 formed in the sensor holding frame 5. However, the present invention is not limited to such an embodiment. For example, when it is possible to ensure a space which allows the pressure introducing passage 31 to ensure a large wall thickness so that the rigidity of the pressure introducing passage 31 can be enhanced, it is unnecessary to provide the metal sleeve 42.

Second Embodiment

Figure 4:
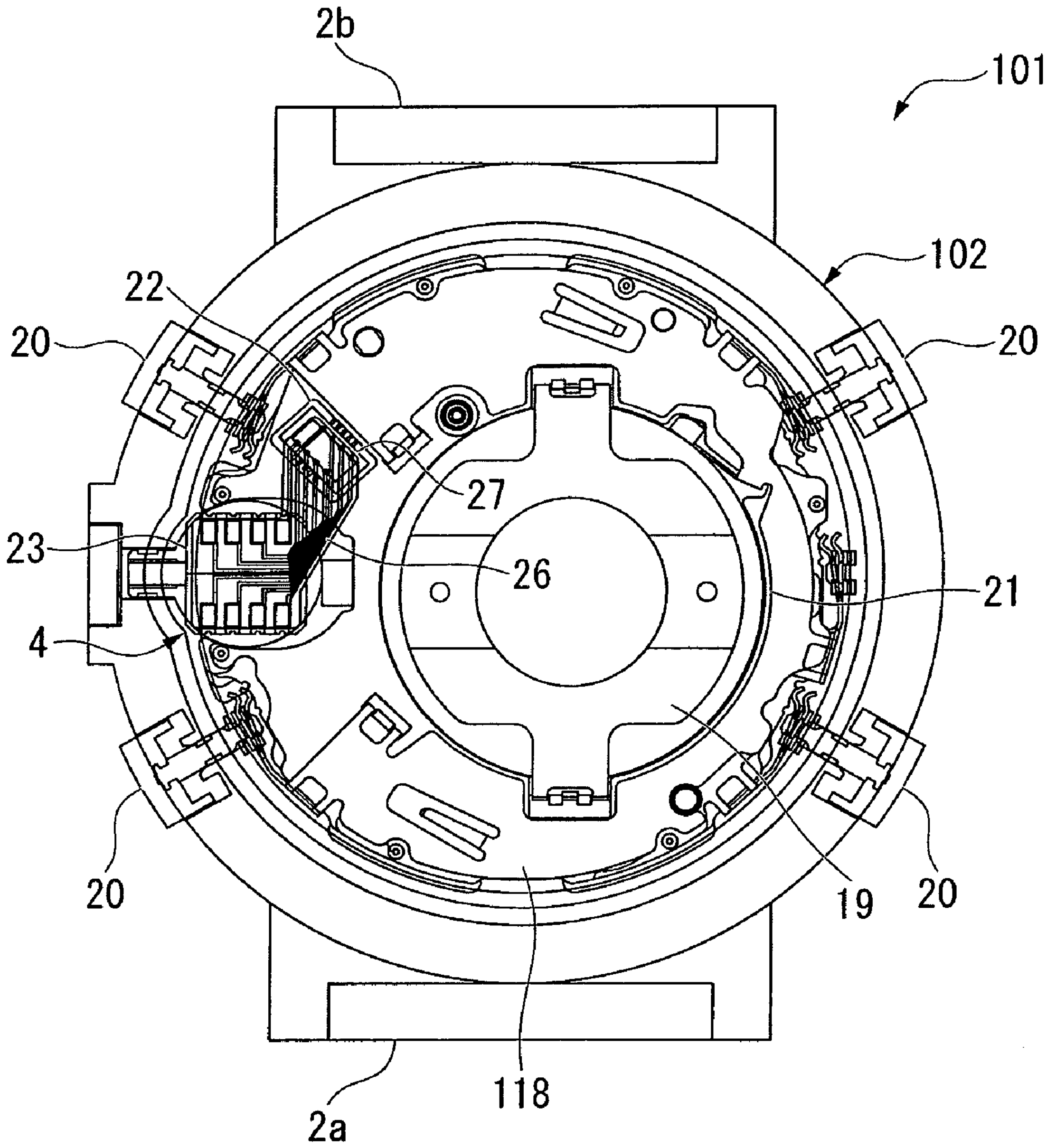
FIG. 4 is a plan view of an electronic timepiece with a pressure sensor according to a second embodiment of the present invention as viewed from a back surface side of the electronic timepiece.
Figure 5:
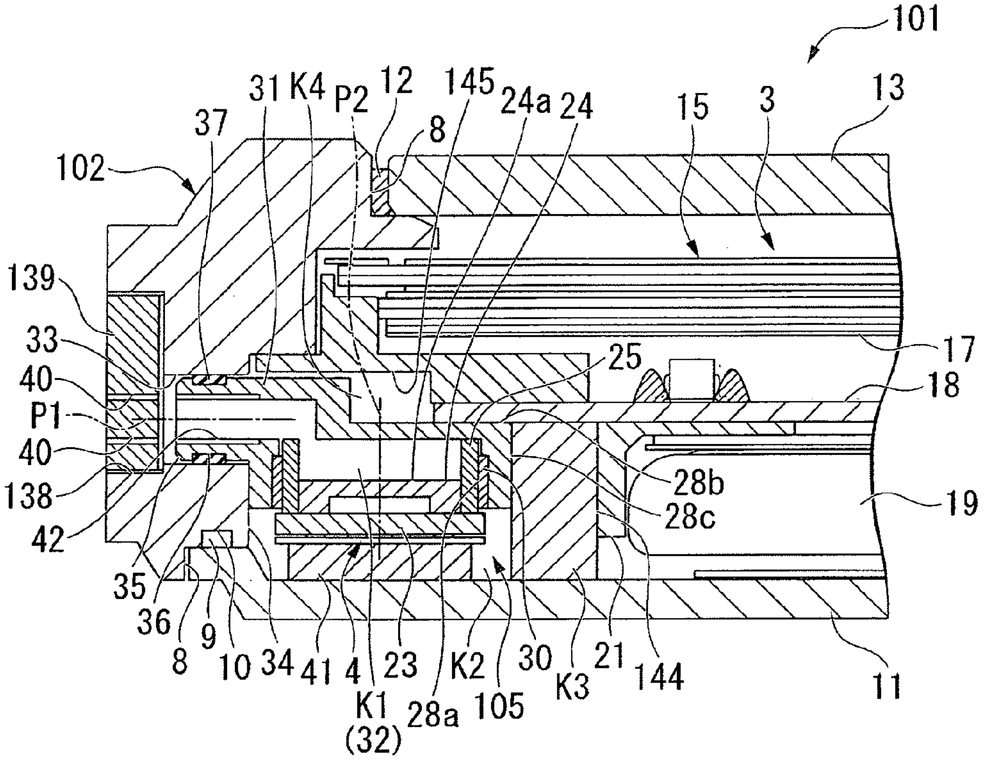
FIG. 5 is a longitudinal cross-sectional view of an essential part of the electronic timepiece with a pressure sensor according to the second embodiment of the present invention.
Figure 6:
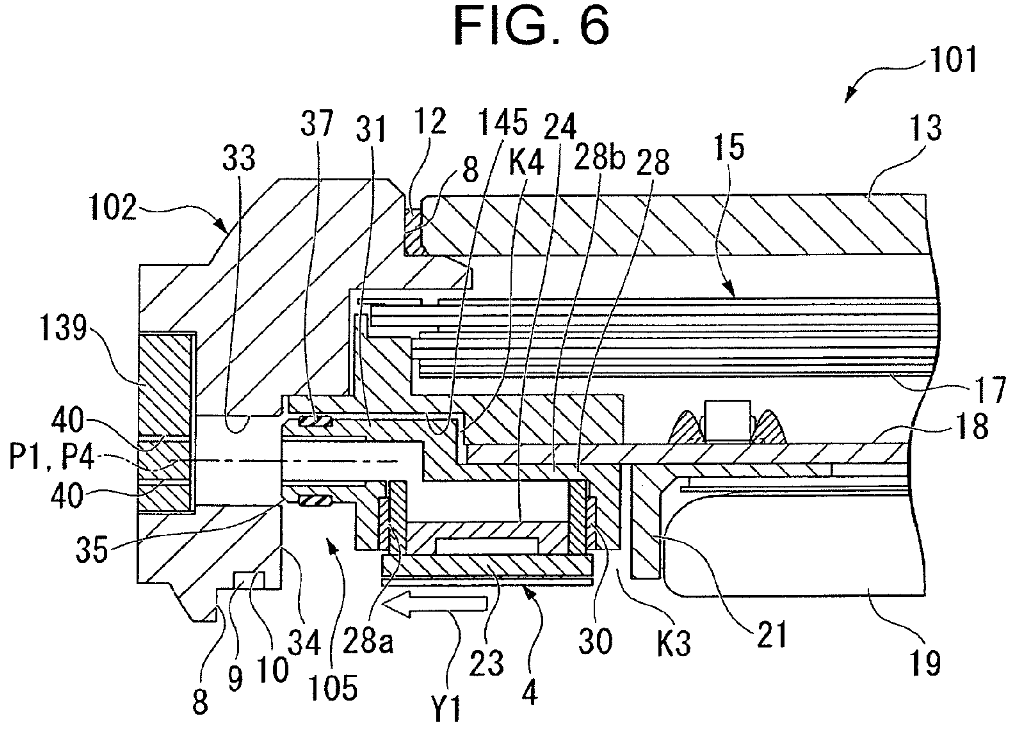
FIG. 6 is an explanatory view showing steps of mounting a sensor holding frame according to the second embodiment of the present invention.

Next, the second embodiment of the present invention is explained in conjunction with FIG. 4 to FIG. 6. Modes of this embodiment substantially equal to the modes of the first embodiment are given same symbols and the explanation of these modes is omitted (the same omission being applicable to embodiments explained hereinafter).

FIG. 4 is a plan view of an electronic timepiece 101 with a pressure sensor according to the second embodiment of the present invention as viewed from a back surface side, and shows a state where a back lid 11 is removed. FIG. 5 is a longitudinal cross-sectional view of an essential part of the electronic timepiece 101 with a pressure sensor.

The second embodiment shares the following substantially same fundamental constitutions with the first embodiment. (Other embodiments explained hereinafter also having the substantially same fundamental constitutions with the first embodiment). That is, the electronic timepiece 101 with a pressure sensor includes an exterior case 102, a timepiece movement 3 which is arranged in the inside of the exterior case 102, and a sensor unit 4. An opening portion 6 is formed on most of the center of the exterior case 102, and the opening portion 6 is closed by a face glass 13 and a back lid 11. The timepiece movement 3 is constituted of a liquid crystal panel 15, a printed circuit board 118, a battery 19 and the like. The sensor unit 4 includes a substrate 23 on which a predetermined wiring pattern is formed, a sensor body 24 which is mounted on an outer surface side of the substrate 23, and a metal-made sensor protecting member 25 which is formed into a cylindrical shape so as to surround the periphery of the sensor body 24, and the sensor unit 4 is arranged in the inside of the exterior case 102 by way of a sensor holding frame 105. A sensor accommodating portion 28 for accommodating the sensor unit 4 which is formed in the sensor holding frame 105 is arranged such that a portion of the sensor accommodating portion 28 and a portion of the printed circuit board 18 overlap with each other in the thickness direction of the exterior case 102. The sensor body 24 is a semiconductor pressure sensor such as a bridge resistance or the like which measures atmospheric pressure, for example.

Here, the second embodiment differs from the first embodiment with respect to a point that while the sensor unit 4 is mounted on the exterior case 2 on a 12 o'clock side in the first embodiment, the sensor unit 4 is mounted on the exterior case 102 on a 9 o'clock side in the second embodiment. The second embodiment also differs from the first embodiment with respect to a point that a shape of the sensor holding frame 5 in the first embodiment differs from a shape of a sensor holding frame 103 in the second embodiment.

That is, as shown in FIG. 4, a connector socket 22 which electrically connects the sensor unit 4 and the printed circuit board 118 is mounted on a printed circuit board 118 of the second embodiment on a 10 o'clock side. A recessed portion 34 is formed in the inside of the exterior case 102 on a 9 o'clock side (left side in FIG. 5), and the sensor accommodating portion 28 of the sensor holding frame 105 is accommodated in the recessed portion 34.

[Sensor Holding Frame]

The sensor holding frame 105 for holding the sensor unit 4 is formed using a resin, and is formed of an integral body constituted of the bottomed cylindrical sensor accommodating portion 28 which can accommodate the sensor unit 4 therein and a cylindrical pressure introducing passage 31 for introducing atmospheric air or water into a pressure chamber 32 of the sensor accommodating chamber 28.

The pressure introducing passage 31 of the sensor holding frame 105 is formed in a portion ranging from a bottom portion 28*b* of the sensor accommodating portion 28 to a side surface of the exterior case 102 in an erected manner toward a 9 o'clock side. That is, a center axis 21 of the pressure introducing passage 31 is arranged approximately orthogonal to a center axis P2 of the sensor accommodating portion 28.

A sensor hole 33 which allows the insertion of the pressure introducing passage 31 therein is formed in the side surface of the exterior case 102 in a penetrating manner on a 9 o'clock side which corresponds to the pressure introducing passage 31. The sensor hole 33 is communicated with the recessed portion 34 in which the sensor accommodating portion 28 of the sensor holding frame 105 is accommodated.

The pressure introducing passage 31 assumes a state where the pressure introducing passage 31 projects toward the outside in the radial direction of the sensor accommodating portion 28 and hence, the sensor accommodating portion 28 assumes a state where the sensor accommodating portion 28 is displaced more toward a 3 o'clock side than a proximal end side of the pressure introducing passage 31.

Due to such a constitution, in a state where a portion of the sensor accommodating portion 28, that is, the portion of the sensor accommodating portion 28 on a more 3 o'clock side than the approximately diametral center of sensor accommodating portion 28 assumes a position on a back surface side of the printed circuit board 18 in a state where the sensor accommodating portion 28 is mounted on the exterior case 102.

In a state where the sensor holding frame 105 is mounted on the exterior case 102, a gap K2 is formed between the sensor unit 4 and a back lid 11. A planar cushion material 41 is mounted on the back lid 11 at a position corresponding to the sensor unit 4.

Further, in a state where the sensor holding frame 105 is mounted on the exterior case 102, a gap K3 is formed between an outer peripheral surface 28*c* of the sensor accommodating portion 28 and a battery frame 21 of the timepiece movement 3.

The gap K3 is set larger than at least an insertion margin of the pressure introducing passage 31 into the sensor hole 33 formed in the exterior case 102. The gap K3 is a space which is used in mounting the sensor holding frame 105 on the exterior case 102 (the detail being described later).

In a state where the sensor holding frame 105 is mounted on the exterior case 102, a holding frame pressing member 144 is mounted in the gap K3. The holding frame pressing member 144 is provided for preventing the removal of the sensor holding frame 105, and is formed of a cushion material or the like, for example.

In the recessed portion 34 formed in the exterior case 102 for accommodating the sensor accommodating portion 28, a small recessed portion 145 is formed at a position corresponding to a proximal end side of the pressure introducing passage 31. By forming the small recessed portion 145, a gap K4 is formed on a proximal end side (a right side in FIG. 5) of the pressure introducing passage 31.

The gap K4 is also a space used in mounting the sensor holding frame 105 on the exterior case 102, and is set larger than at least an insertion margin of the pressure introducing passage 31 into the sensor hole 33 formed in the exterior case 102.

On a portion of the exterior case 102 which corresponds to the sensor hole 33, an open recessed portion 138 which makes the sensor hole 33 and the outside of the exterior case 102 communicate with each other is formed. That is, the open recessed portion 138 is formed on the side surface of the exterior case 102 at a 9 o'clock side.

A cover 139 which closes the open recessed portion 138 is formed on the open recessed portion 138, and prevents the intrusion of dusts into the inside of the pressure introducing passage 31 while allowing the introduction of atmospheric air and water into the inside of the pressure introducing passage 31.

(Steps of Mounting the Sensor Holding Frame)

Next, steps of mounting the sensor holding frame 105 according to the second embodiment is explained in conjunction with FIG. 5 and FIG. 6.

FIG. 6 is an explanatory view showing the steps of mounting the sensor holding frame 105.

As shown in the drawing, firstly, the sensor unit 4 is mounted on the sensor holding frame 105 in advance. Then, the back lid 11 is removed, and also the holding frame pressing member 144 is removed, and the sensor holding frame 105 is placed on the recessed portion 34 of the exterior case 102 with the pressure introducing passage 31 directed toward an outer surface side (upper side in FIG. 6).

With respect to the recessed portion 34 of the exterior case 102, in a state where the sensor holding frame 105 is mounted on the exterior case 102, a gap K3 is formed between an outer peripheral surface 28*c* of the sensor accommodating portion 28 and the battery frame 21 of the timepiece movement 3. Further, the gap K4 is formed on the proximal end side of the pressure introducing passage 31.

Due to such a constitution, by positioning the sensor holding frame 105 in the gaps K3 and K4, the center axis P1 of the pressure introducing passage 31 and the center axis P4 of the sensor hole 33 formed in the exterior case 102 can be positioned on the same straight line.

In such a state, to insert the pressure introducing passage 31 into the sensor hole 33, the sensor holding frame 105 is slidably moved toward a side surface side of the exterior case 102 (see an arrow Y1 in FIG. 6).

Accordingly, as shown in FIG. 5, the pressure introducing passage 31 is inserted into the sensor hole 33 and the sensor holding frame 105 is moved to a predetermined position. When the sensor holding frame 105 is moved to the predetermined position, the gap K3 is formed between the outer peripheral surface 28*c* of the sensor accommodating portion 28 and the battery frame 21 of the timepiece movement 3. By mounting the holding frame pressing member 144 in the gap K3, the mounting of the sensor holding frame 105 is completed. Then, the printed circuit board 18 and the sensor unit 4 are connected with each other using the flexible printed circuit board 26 and, thereafter, the back lid 11 is mounted on the exterior case 102.

In this manner, according to the above-mentioned second embodiment, in addition to advantageous effects substantially equal to the advantageous effects acquired by the above-mentioned first embodiment, it is possible to select the design which uses the sensor holding frame 5 of the above-mentioned first embodiment or the design which uses the sensor holding frame 105 of the second embodiment depending on the specification of the electronic timepiece 101 with a pressure sensor and hence, the degree of freedom in the layout of the sensor unit 4 can be enhanced. Accordingly, the variation of the electronic timepiece 101 with a pressure sensor can be increased.

In the above-mentioned second embodiment, the explanation has been made with respect to the case where the sensor unit 4 is arranged on a 9 o'clock side of the exterior case 102. However, the present invention is not limited to such a case, and the sensor holding frame 105 of the second embodiment is applicable to any constitution where the distal end of the pressure introducing passage 31 is directed toward the side surface of the exterior case 102. For example, even when the sensor unit 4 is arranged on a 3 o'clock side of the exterior case 102, the exterior case 102 is applicable.

Further, in the above-mentioned second embodiment, the explanation has been made with respect to the case where the center axis P1 of the pressure introducing passage 31 is arranged approximately orthogonal to the center axis P2 of the sensor accommodating portion 28. However, the present invention is not limited to such a case, and the center axis P1 of the pressure introducing passage 31 may be inclined with respect to the center axis P2 of the sensor accommodating portion 28 depending on the position of the sensor unit 4, a shape of the exterior case 102 or the like.

Third Embodiment

Figure 7:
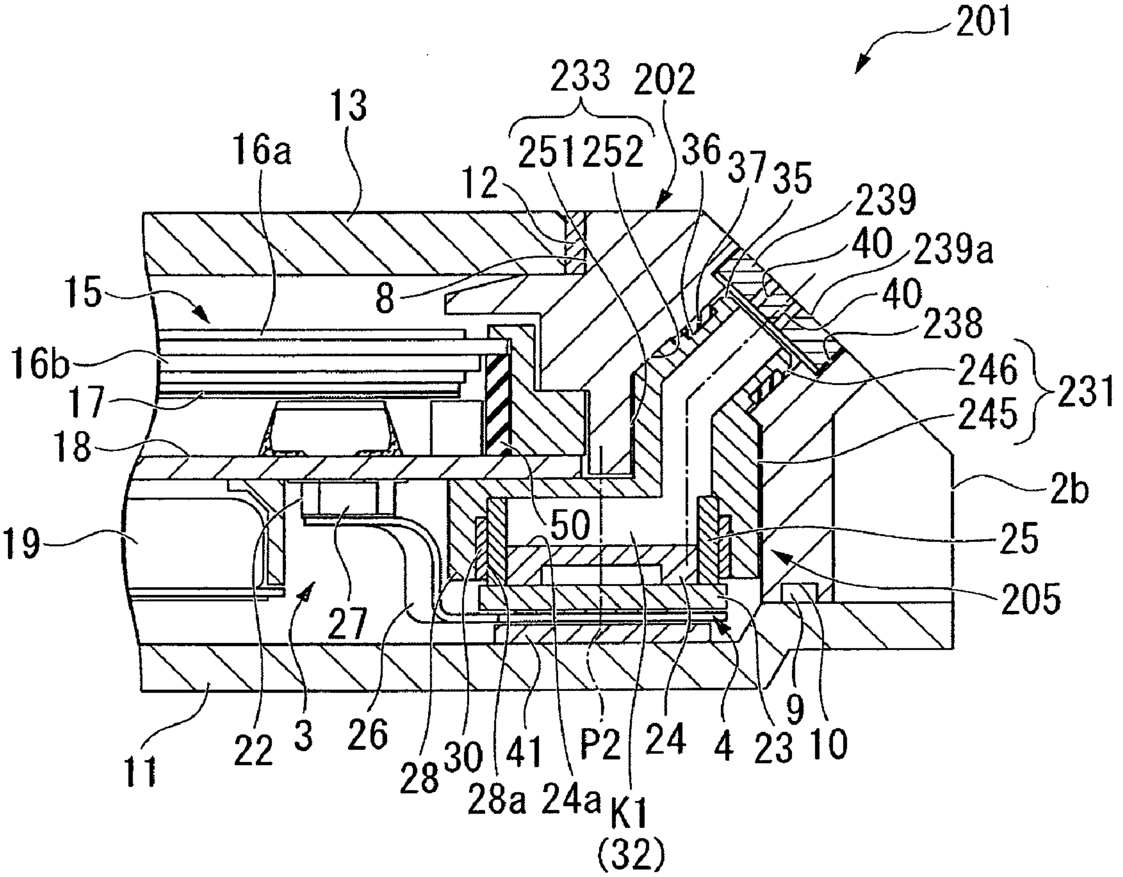
FIG. 7 is a longitudinal cross-sectional view of an essential part of an electronic timepiece with a pressure sensor according to a third embodiment of the present invention.

Next, the third embodiment of the present invention is explained in conjunction with FIG. 7.

FIG. 7 is a longitudinal cross-sectional view of an essential part of an electronic timepiece 201 with a pressure sensor according to the third embodiment.

A sensor holding frame 205 of the electronic timepiece 201 with a pressure sensor according to the third embodiment differs from the sensor holding frame 5 of the electronic timepiece 1 with a pressure sensor according to the first embodiment with respect to the following constitution. That is, while the pressure introducing passage 31 of the sensor holding frame 5 according to the first embodiment is formed into a straight-line shape, a pressure introducing passage 231 of the sensor holding frame 205 according to the third embodiment is formed into a bent shape.

That is, as shown in FIG. 7, the sensor holding frame 205 is formed using a resin, and is formed of an integral body constituted of a sensor accommodating portion 28 and the pressure introducing passage 231 which is mounted on a bottom portion **28*b* of the sensor accommodating portion 28 in an erected manner. The pressure introducing passage 231 is arranged on a 12 o'clock side of the sensor accommodating portion 28**.

The pressure introducing passage 231 is constituted of a first cylindrical portion 245 which is formed on the bottom portion **28*b* of the sensor accommodating portion 28 in an erected manner in the direction perpendicular to the bottom portion 28*b*, and a second cylindrical portion 246 which is formed by bending such that the second cylindrical portion 246 is inclined toward a 12 o'clock side from a distal end of the first cylindrical portion 245. Due to such a constitution, a distal end of the pressure introducing passage 231 is directed toward the 12 o'clock side more compared to the distal end of the above-mentioned pressure introducing passage 31** of the first embodiment.

A sensor hole 233 which corresponds to the pressure introducing passage 231 is formed in the exterior case 202 of the electronic timepiece 201 with a pressure sensor. That is, the sensor hole 233 is formed such that a first hole 251 which is formed along the thickness direction of the exterior case 202 and allows the insertion of the first cylindrical portion 245 of the pressure introducing passage 231 thereinto and a second hole 252 which is formed in a bent shape directing obliquely toward a 12 o'clock side from a distal end of the first hole 251 and allows the insertion of the second cylindrical portion 246 of the pressure introducing passage 231 thereinto is are communicated with each other.

On a portion of the exterior case 202 which corresponds to the second hole 252 of the sensor hole 233, an open recessed portion 238 which makes the second hole 252 communicated with the outside of the exterior case 202 is formed. That is, the open recessed portion 238 is not formed on the same plane as a face glass 13 which is mounted on the exterior case 202, and is formed in the vicinity of a side surface of the exterior case 202 which is inclined with respect to the face glass 13.

A cover 239 which closes the open recessed portion 238 is mounted on the open recessed portion 238. The cover 239 is formed such that an outer surface **239*a* side of the cover 239 becomes coplanar with the exterior case 202**.

A plurality of small-diameter holes 40 are formed in the cover 239 in a penetrating manner in the thickness direction of the cover 239 thus preventing the intrusion of dusts into the inside of the pressure introducing passage 231 while allowing the introduction of atmospheric air or water into the inside of the pressure introducing passage 231.

In this manner, according to the above-mentioned third embodiment, in addition to advantageous effects substantially equal to the advantageous effects acquired by the above-mentioned first embodiment, it is possible to increase the variation in design of the electronic timepiece 201 with a pressure sensor.

The present invention is not limited to the above-mentioned embodiments and includes modifications which are acquired by adding various changes to the above-mentioned embodiments without departing from the gist of the present invention.

For example, in the above-mentioned embodiments, the explanation has been made with respect to the case where sensor holding frame 5, 105, 205 is used in the electronic timepiece 1, 101, 201 with a pressure sensor respectively. However, the present invention is not limited to these embodiments. That is, the sensor holding frame 5, 105, 205 is applicable to various electronic apparatuses in which the sensor unit 4 is incorporated such as a mobile phone apparatus, an electronic computer, a radio receiver set and the like.

Further, in the above-mentioned embodiments, the explanation has been made with respect to the case where a part of the sensor accommodating portion 28 which accommodates the sensor unit 4 of the sensor holding frame 5, 105, 205 is arranged in an overlapping manner with a part of the printed circuit board 18 in the thickness direction of the exterior case 2, 102, 202. However, the present invention is not limited to such a case. That is, the whole sensor accommodating portion 28 may be arranged on a back surface side of the printed circuit board 18.

What is claimed is:

1. An electronic apparatus with a sensor comprising:
- an exterior case;
- a sensor unit which is arranged in the inside of the exterior case and detects pressure; and
- a sensor holding frame which is arranged between the exterior case and the sensor unit, and is provided for mounting the sensor unit on the exterior case, wherein
- the sensor holding frame includes:
- a sensor accommodating portion which accommodates the sensor unit and is provided with a pressure chamber into which the pressure is taken in front of a detection part of the sensor unit; and
- a pressure introducing passage through which pressure is introduced into the pressure chamber from the outside of the exterior case, and
- a center axis of the sensor accommodating portion and a center axis of the pressure introducing passage are displaced from each other.

2. An electronic apparatus with a sensor according to claim 1, wherein the center axis of the pressure introducing passage is offset from the center axis of the sensor accommodating portion.

3. An electronic apparatus with a sensor according to claim 1, wherein the center axis of the pressure introducing passage intersects with the center axis of the sensor accommodating portion.

4. An electronic apparatus with a sensor according to claim 1, wherein the sensor holding frame is formed using a resin, and a reinforcing tube for enhancing the rigidity of the pressure introducing passage is mounted on an inner peripheral surface of the pressure introducing passage.

5. An electronic apparatus with a sensor according to claim 2, wherein the sensor holding frame is formed using a resin, and a reinforcing tube for enhancing the rigidity of the pressure introducing passage is mounted on an inner peripheral surface of the pressure introducing passage.

6. An electronic apparatus with a sensor according to claim 3, wherein the sensor holding frame is formed using a resin, and a reinforcing tube for enhancing the rigidity of the pressure introducing passage is mounted on an inner peripheral surface of the pressure introducing passage.

7. An electronic apparatus with a sensor according to claim 1, wherein a cover in which a plurality of small-diameter holes are formed in a penetrating manner is provided at a position corresponding to an opening end of the pressure introducing passage in the exterior case.

8. An electronic apparatus with a sensor according to claim 2, wherein a cover in which a plurality of small-diameter holes are formed in a penetrating manner is provided at a position corresponding to an opening end of the pressure introducing passage in the exterior case.

9. An electronic apparatus with a sensor according to claim 3, wherein a cover in which a plurality of small-diameter holes are formed in a penetrating manner is provided at a position corresponding to an opening end of the pressure introducing passage in the exterior case.

10. An electronic apparatus with a sensor according to claim 4, wherein a cover in which a plurality of small-diameter holes are formed in a penetrating manner is provided at a position corresponding to an opening end of the pressure introducing passage in the exterior case.

11. An electronic apparatus with a sensor according to claim 5, wherein a cover in which a plurality of small-diameter holes are formed in a penetrating manner is provided at a position corresponding to an opening end of the pressure introducing passage in the exterior case.

12. An electronic apparatus with a sensor according to claim 6, wherein a cover in which a plurality of small-diameter holes are formed in a penetrating manner is provided at a position corresponding to an opening end of the pressure introducing passage in the exterior case.

13. An electronic apparatus with a sensor according to claim 1, wherein a timepiece movement is arranged in the inside of the exterior case, and the sensor holding frame is arranged on a back surface of the timepiece movement such that at least a portion of the sensor accommodating portion overlaps with the sensor holding frame.

14. An electronic apparatus with a sensor according to claim 2, wherein a timepiece movement is arranged in the inside of the exterior case, and the sensor holding frame is arranged on a back surface of the timepiece movement such that at least a portion of the sensor accommodating portion overlaps with the sensor holding frame.

15. An electronic apparatus with a sensor according to claim 3, wherein a timepiece movement is arranged in the inside of the exterior case, and the sensor holding frame is arranged on a back surface of the timepiece movement such that at least a portion of the sensor accommodating portion overlaps with the sensor holding frame.

16. An electronic apparatus with a sensor according to claim 4, wherein a timepiece movement is arranged in the inside of the exterior case, and the sensor holding frame is arranged on a back surface of the timepiece movement such that at least a portion of the sensor accommodating portion overlaps with the sensor holding frame.

17. An electronic apparatus with a sensor according to claim 5, wherein a timepiece movement is arranged in the inside of the exterior case, and the sensor holding frame is arranged on a back surface of the timepiece movement such that at least a portion of the sensor accommodating portion overlaps with the sensor holding frame.

18. An electronic apparatus with a sensor according to claim 6, wherein a timepiece movement is arranged in the inside of the exterior case, and the sensor holding frame is arranged on a back surface of the timepiece movement such that at least a portion of the sensor accommodating portion overlaps with the sensor holding frame.

19. An electronic apparatus with a sensor according to claim 7, wherein a timepiece movement is arranged in the inside of the exterior case, and the sensor holding frame is arranged on a back surface of the timepiece movement such that at least a portion of the sensor accommodating portion overlaps with the sensor holding frame.

20. An electronic apparatus with a sensor according to claim 8, wherein a timepiece movement is arranged in the inside of the exterior case, and the sensor holding frame is arranged on a back surface of the timepiece movement such that at least a portion of the sensor accommodating portion overlaps with the sensor holding frame.

* * * * *